US006704766B1

(12) United States Patent
Goss et al.

(10) Patent No.: US 6,704,766 B1
(45) Date of Patent: Mar. 9, 2004

(54) METHOD AND APPARATUS FOR DYNAMICALLY CONTROLLING THE EXECUTION OF A REQUEST HANDLER ON A PROCESSOR RESOURCE

(75) Inventors: Steven N. Goss, Kingston, NY (US); Gary M. King, Millbrook, NY (US); Jeffrey P. Kubala, Poughquag, NY (US); John C. Nagy, Saugerties, NY (US); David H. Surman, Milton, NY (US); Wendell W. Wilkinson, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 08/927,222

(22) Filed: Sep. 10, 1997

(51) Int. Cl.[7] ................................................ G06F 9/00
(52) U.S. Cl. ........................ 709/104; 709/226; 709/229
(58) Field of Search ............................... 709/104, 202, 709/101, 226–229

(56) References Cited

U.S. PATENT DOCUMENTS

| | | | |
|---|---|---|---|
| 4,843,541 A | | 6/1989 | Bean et al. |
| 5,287,521 A | * | 2/1994 | Nitta et al. ................... 710/200 |
| 5,410,655 A | | 4/1995 | Greenfield et al. |
| 5,561,809 A | | 10/1996 | Elko et al. |
| 5,564,040 A | | 10/1996 | Kubala |
| 5,564,903 A | | 10/1996 | Eccles et al. |
| 5,574,945 A | | 11/1996 | Elko et al. |

OTHER PUBLICATIONS (Becker) Becker, Rachel. "Oracle Unleashed" p. 951–956, Feb. 1996.*
"Enterprise Systems Architecture/390 Principles of Operation" SA22–7201–02, Dec. 1994.
"Processor Resource/Systems Manager Planning Guide" GA22–7236–01, Jun. 1997.

* cited by examiner

*Primary Examiner*—John Follansbee
*Assistant Examiner*—Lewis A. Bullock, Jr.
(74) *Attorney, Agent, or Firm*—William A. Kinnaman, Jr.

(57) ABSTRACT

A method and apparatus for dynamically controlling the dispatching of a coupling facility operating in a logical partition sharing a processor resource with one or more other logical partitions issuing requests to the coupling facility. A plurality of coupling facility dispatching modes differing in their relative dispatch duration are defined. One dispatching mode is initially selected, and the number of requests received from the other logical partitions within a predetermined interval while in a selected dispatching mode is determined. Transitions between the defined dispatching modes are made in accordance with the number of requests received within the sampling interval in the selected dispatching mode. The method and apparatus are especially suitable for controlling the dispatching of a backup coupling facility, whose polling loop would otherwise consume processor resources usable by other logical

15 Claims, 4 Drawing Sheets

METHOD AND APPARATUS FOR DYNAMICALLY CONTROLLING THE EXECUTION OF A REQUEST HANDLER ON A PROCESSOR RESOURCE

BACKGROUND OF THE INVENTION

1. Field of the Invention

This invention relates to a method and apparatus for dynamically controlling the execution of a request handler on a processor resource. More particularly, the invention relates to a method and apparatus for dynamically controlling the dispatching of the polling loop of a coupling facility operating in a logical partition of a partitioned information handling system

2. Description of the Related Art

Many computer hardware machines conforming to the IBM® S/390® architecture, as described, for example, in the IBM publication *Enterprise Systems Architecture/390 Principles of Operation*, SA22-7201-02, December 1994, incorporated herein by reference, operate in what is known as logically partitioned (LPAR) mode. Logically partitioned computer systems are well known in the art and are described in Guyette et al. U.S. Pat. No. 4,564,903, Bean et al. U.S. Pat. No. 4,843,541, and Kubala U.S. Pat. No. 5,564,040, incorporated herein by reference. Commercial embodiments of logically partitioned systems include IBM S/390 processors with the Processor Resource/Systems Manager™ (PR/SM™) feature and described, for example, in the IBM publication *Processor Resource/Systems Manager Planning Guide*, GA22-7236-01, June 1997, incorporated herein by reference.

Logical partitioning allows the establishment of a plurality of system images within a single physical machine, or central processor complex (CPC). Each system image is capable of operating as if it were a separate computer system. That is, each logical partition can be independently reset, initially loaded with an operating system that may be different for each logical partition, and operate with different software programs using different input/output (I/O) devices. Logical partitioning is in common use today because it provides its users with flexibility to change the number of logical partitions in use and the amount of physical system resources assigned to each partition, in some cases while the entire central processor complex continues to operate.

A recent addition to the IBM S/390 architecture, usually operating in a logically partitioned environment, is the IBM Parallel Sysplex™ configuration, comprising two or more systems interconnected via a coupling facility to form what is known as a "sysplex" (for "system complex"). A sysplex configuration may have more than one coupling facility, for example a backup coupling facility set to take over if a primary coupling facility fails. Each system that is a member of a sysplex may be either a separate hardware machine or a separate logical partition of a particular hardware machine. In a similar manner, each coupling facility in the sysplex may be either a separate hardware machine or a separate logical partition of a particular hardware machine. Each S/390 coupling facility, whether a separate hardware machine or a separate logical partition of a particular hardware machine, is implemented by microcode known as coupling facility control code (CFCC).

In the S/390 Parallel Sysplex architecture, a system issues a request to a coupling facility using a Send Message (SMSG) instruction. This instruction is executed by a central processor (CP) of the machine on which the system resides; this CP may be a logical CP if the system resides in a logical partition. The executing CP causes a message command block (MCB) to be sent along a message path to the coupling facility and receives back a message response block (MRB) containing the results of the request. Message communication and other aspects of the operation of an S/390 coupling facility are described in such references as Elko et al. U.S. Pat. No. 5,561,80, Elko et al. application Ser. No. 08/147,697, filed Nov. 4, 1993, and the patents and applications referred to therein, all incorporated herein by reference.

SMSG instructions may be executed either synchronously or asynchronously. When executed asynchronously, the SMSG instruction is competed as soon as the request in the form of an MCB is sent off to the target coupling facility. When executed synchronously, on the other hand, the SMSG instruction is not completed until a response in the form of an MRB is received back from the target facility. The handling of synchronous and asynchronous requests in an S/390 Parallel Sysplex environment is described further in the copending application of applicant J. P. Kubala et al., Ser. No. 08/903,285, filed Jul. 30, 1997, incorporated herein by reference.

The responsiveness of a coupling facility is a critical factor in the performance of a S/390 Parallel Sysplex configuration. The majority of coupling facility (SMSG) requests from an originating system are synchronous in nature, that is, the issuing processor remains in a busy state while waiting for the coupling facility request to complete. Thus, the coupling facility response time has a direct impact on the system processing cost of coupling facility requests.

Coupling facility response time has two components: (1) the time elapsed before the coupling facility control code recognizes that a request has arrived and is ready to be processed; (2) the time the control code spends processing the request. In order to minimize the first component (recognition time), the control code constantly runs a "polling loop" on each processing engine of the coupling facility to look for newly arrived requests. While effective in minimizing recognition time, this polling loop can consume all processor resource allocated to a coupling facility partition.

For high availability, multiple coupling facilities are required in a Parallel Sysplex configuration. In the event of the failure of one coupling facility, there must be one or more alternative coupling facilities to take over the load of the failed coupling facility. Often a cost-effective configuration will include primary and backup coupling facilities, where the backup coupling facility is asked to process coupling facility requests only in the event of the failure of the primary coupling facility. Furthermore, the backup coupling facility can be defined as a partition with one or more shared processors on the same central processor complex with system partitions (i.e., those partitions containing an operating system such as OS/390 rather than coupling facility control code).

Providing a backup coupling facility partition on the same machine as the system partitions creates a problem, however. If sufficient processor resources are made available to the backup coupling facility partition so that it can process the full load in the event of a failure of the primary coupling facility, then the control code polling loop will consume all those resources the rest of the time, making them unavailable to the system partitions. On the other hand, if only a small amount of processor resource is made available to the backup coupling facility partition, it cannot be responsive to a primary coupling facility failure condition. A similar problem arises when defining coupling facility partitions that only need to process very low coupling facility request rates (for example, for testing purposes).

SUMMARY OF THE INVENTION

In general, the present invention contemplates a method and apparatus of dynamically controlling the execution of a request handler on a processor resource in an information handling system in which one or more requesters issue requests to a request handler executing on the processor resource. In accordance with the invention, a plurality of request handler execution modes are defined having differing amounts of utilization of the processor resource. Initially, one of the execution modes is selected, and the number of requests received from the requesters within a predetermined interval while executing the request handler in the selected mode is determined. Transitions are made between the request handler execution modes in accordance with the number of requests received within the predetermined interval in the selected mode.

The requesters and the request handler may reside in different logical partitions of a logically partitioned system. Typically, the requesters execute on the same processor resource as the request handler and remain in a busy state pending completion of said requests by the request handler. The invention is especially suitable for controlling the dispatching of a backup coupling facility, whose polling loop would otherwise consume processor resources usable by other logical partitions.

More particularly, in accordance with the present invention the frequency and duration of dispatching the control code polling loop are dynamically adjusted based on the arrival rate of coupling facility requests to minimize the sum of the processor resource used by the coupling facility partition to recognize the arrival of coupling facility requests and the processor resource of the system partition spent waiting for its coupling facility requests to be recognized. With this procedure, shared coupling facility partitions can effectively be used as backup or test coupling facilities.

The procedure considers the following tradeoff: as the frequency of dispatching the control code polling loop is reduced, coupling facility processor resource consumption is reduced, but some coupling facility requests will arrive during the non-dispatched intervals and these requests will suffer an elongated response time. At low arrival rates, the elongated response time will have little impact on the system partition issuing the requests. However, at high arrival rates, even a small increase in response time can negatively impact performance. Thus, the procedure dynamically adjusts to the arrival rates. In a preferred embodiment, the non-dispatched duration is adjusted among 1, 2 and 5 milliseconds while the dispatched duration effectively varies from less than 1 millisecond to always dispatched. The procedure executes on each shared processor of the coupling facility partition.

DESCRIPTION OF THE PREFERRED EMBODIMENT

Figure 1:
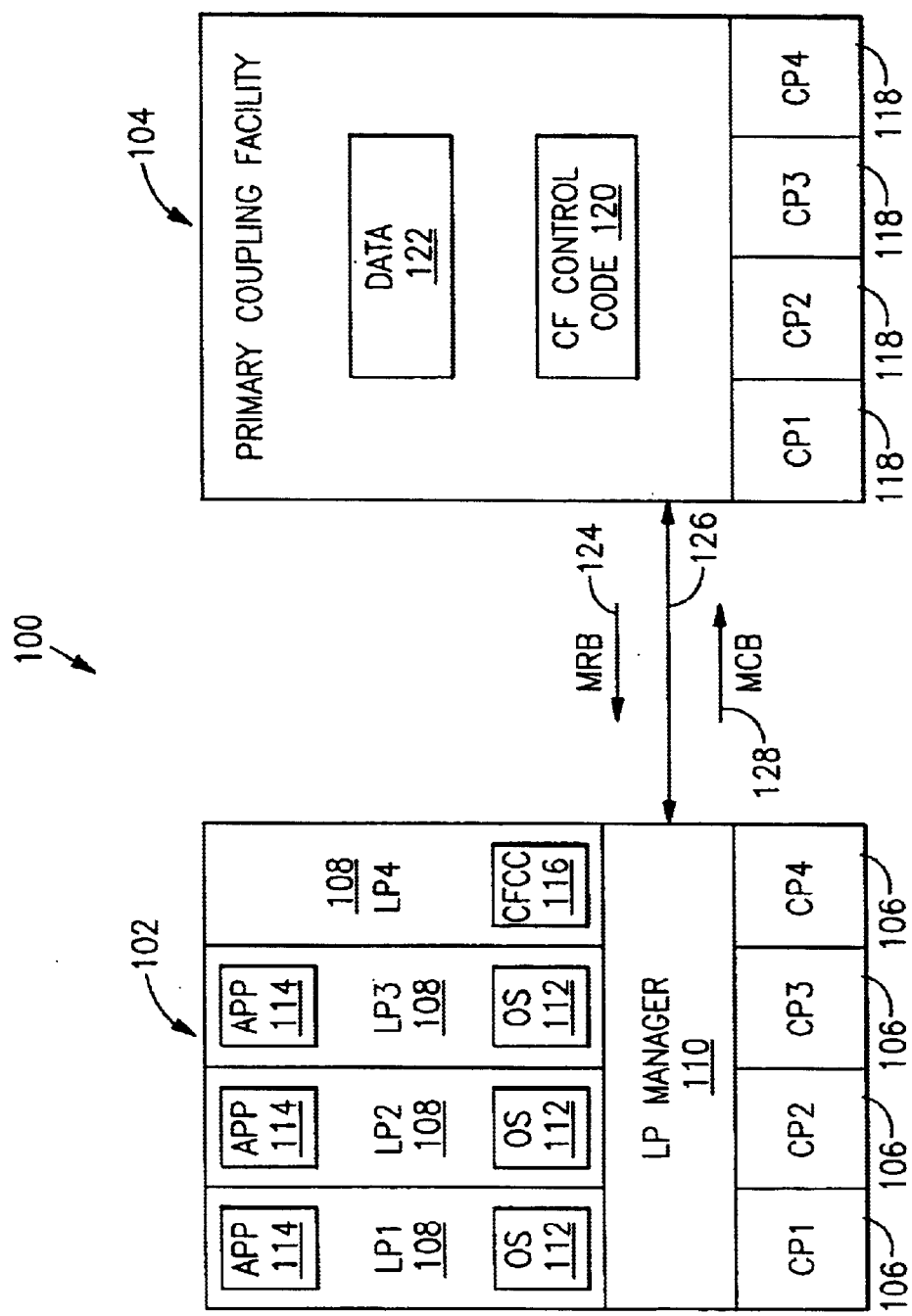
FIG. 1 is a schematic block diagram of a computer system complex incorporating the present invention.

Referring to FIG. 1, an exemplary computer system complex 100 incorporating the present invention includes a central processor complex (CPC) 102 and a external primary coupling facility (CF) 104 to which the CPC is attached.

CPC 102 includes one or more central processors 106, an exemplary four of which (CP1–CP4) are shown, and associated central storage not separately shown.

As shown in FIG. 1, the resources of CPC 102 are allocated among four logical partitions (LPs) 108, an exemplary four of which (LP1–LP4) are shown, each of which appears to its resident programming as a separate hardware machine. Logical partitions 108 are managed by a logical partition manager 110 implemented by microcode running on processors 106. Logical partitions 108 (LP1–LP4) and logical partition manager 110 each comprise one or more programs residing in respective portions of central storage.

Each logical partition 108 has one or more logical processors (not separately shown), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition). In the discussion that follows, it will be assumed that the logical processors of coupling facility partition LP4 are shared with one or more system partitions LP1–LP3.

In the example shown, each of logical partitions LP1–LP3 functions as a normal system having a resident operating system 112 (which may differ for each logical partition) and typically one or more applications 114, and is regarded as a separate system for the purpose of this specification; partitions such as partitions LP1–LP3 with operating systems and application programs resident therein are referred to herein as system partitions. Suitable such operating systems in an S/390 environment include the IBM programs OS/390™, MVS/ESA™, VM/ESA™, VSE/ESA™ and Transaction Processing Facility (TPF). Logical partitioning in an S/390 environment is discussed further in the references cited above.

Partition LP4, on the other hand, contains coupling facility control code (CFCC) 116 that implements coupling facility functions. It thus constitutes an additional internal or inboard coupling facility, which may serve as either a primary coupling facility or (as will be assumed here) as a backup to external coupling facility 104. Partitions 108 such as partition LP4 with coupling facility control code 116 rather than an operating system 112 are referred to herein as coupling facility (CF) partitions to distinguish them from system partitions LP1–LP3.

Primary coupling facility 104 includes one or more central processors 118, an exemplary four of which (CP1–CP4) are shown. In contrast to the logical CPs (not shown) of coupling facility partition LP4, which are assumed to be shared with other partitions, the (physical) CPs 118 of external coupling facility 102 are dedicated. Coupling facility 104 also has coupling facility control code 120, similar to control code 116 in logical partition LP4, as well as shared data 122, which may comprise a list structure or the like.

Coupling facility 104 accesses requested data 122 in response to a request received from a requesting system (e.g., system partition LP1). As described above, in the S/390 Parallel Sysplex architecture a system issues a request to a coupling facility using a Send Message (SMSG) instruction. This instruction is executed by a central processor (CP) 106 of the machine 102 on which the system resides; this CP 106 is a logical CP if, as here, the system resides in a logical partition. The executing CP 106 causes a message command block (MCB) 124 to be sent along a message path 126 to the coupling facility 104 and receives back a message response block (MRB) 128 containing the results of the request.

The particulars of message communication and other aspects of the operation of an S/390 coupling facility, while not essential to an understanding of the present invention, are described in such references as Elko et al. U.S. Pat. No. 5,561,80, Elko et al. application Ser. No. 08/147,697, filed Nov. 4, 1993, and the patents and application referred to therein, all incorporated herein by reference.

As noted above, SMSG instructions may be executed either synchronously or asynchronously. When executed asynchronously, the SMSG instruction is competed as soon as the request in the form of an MCB 124 is sent off to the target coupling facility. When executed synchronously, on the other hand, the SMSG instruction is not completed until a response in the form of an MRB 128 is received back from the target facility.

For many requests, the synchronous mode of operation is the preferred mode of operation, Even though the originating processor 106 remains in a busy state pending the completion of the request, the resulting overhead is less than the overhead that would result from switching to another task and then back again when the original request is complete. The synchronous mode of operation will be assumed in the discussion that follows.

As indicated above, in the disclosed embodiment external coupling facility 104 functions as the primary coupling facility, while coupling facility partition LP4 in CPC 102 functions as a backup coupling facility, to be pressed into service should the primary facility fail. Thus, in the event of a failure of the primary facility 104, MCBs 124 that were formerly directed to the primary facility are directed instead (using suitable redirecting means that form no part of the present invention) to the backup facility in partition LP4 along an alternative message path (not shown). The backup facility in LP4 processes these MCBs 124 in the same manner as primary facility 104 and transmits responses in the form of MRBs 128 back to the originating system partition.

The control code 116 in coupling facility partition LP4 runs a polling loop on each of its (shared) logical processors that checks for newly arriving requests 124 from system partitions LP1–LP3; this occurs even though no incoming requests may be arriving because primary coupling facility 104 is operational. To prevent this polling loop from consuming processor resources that would otherwise be available to another partition LP1–LP3 sharing a processor 106 with partition LP4, the control code 116 dynamically controls the dispatching of the polling loop on each logical processor of the coupling facility partition LP4 in accordance with the arrival rate of incoming requests, as described below.

The dynamic dispatching procedure that control code 116 runs on each shared logical processor of the coupling facility partition LP4 is defined by the following pseudocode:

D1: Dispatch polling loop for 1 millisecond
  IF number_arrivals >0 THEN GOTO D1
  IF number_arrivals=0 THEN GOTO N1
N1: Non-dispatch for 1 millisecond
  Run polling loop once
  IF number_arrivals>0 THEN GOTO D1
  IF number_arrivals=0 THEN GOTO N2
Non-dispatch for 2 milliseconds
  Run polling loop once
  IF number_arrivals>1 THEN GOTO D1
  IF number_arrivals=1 THEN GOTO N1
  IF number_arrivals=0 THEN
    IF>=10 consecutive times at N2 THEN GOTO N5
    IF<10 consecutive times at N2 THEN GOTO N2
N5: Non-dispatch for 5 milliseconds
  Run polling loop once
  IF number_arrivals>1 THEN GOTO D1
  IF number_arrivals=1 THEN GOTO N2
  IF number_arrivals=0 THEN GOTO N5

Mode D1 is in effect a continuous dispatching mode, while modes N1, N2 and N5 run the polling loop once after non-dispatched durations of 1, 2 and 5 ms, respectively. In general, the dispatching procedure selects either continuous dispatching (i.e., a non-dispatched duration of zero) or a specified non-dispatched duration, depending on the results of the previous polling loops. Thus, more than one arrival while in a given mode will result in a return to the continuous dispatching mode D1, while a single arrival while in mode N5 or N2 will result in a transition to the respective mode N2 or N1 having the next smaller non-dispatch interval. An absence of any arrivals, on the other hand, generally results in a transition to the mode having the next larger non-dispatch interval, with the transition from mode N2 to node N5 being delayed until ten intervals have elapsed without any arrivals.

As may be inferred from the above pseudocode, in the absence of any incoming requests, the control code 116 settles into mode N5, which has a non-dispatched duration of 5 ms and consumes only a small amount of processor resource. On the other hand, any appreciable amount of incoming traffic causes the control code 116 soon to settle into mode D1, which dispatches the polling loop continuously and therefore minimizes the recognition component of the overall response time.

Figure 2A:
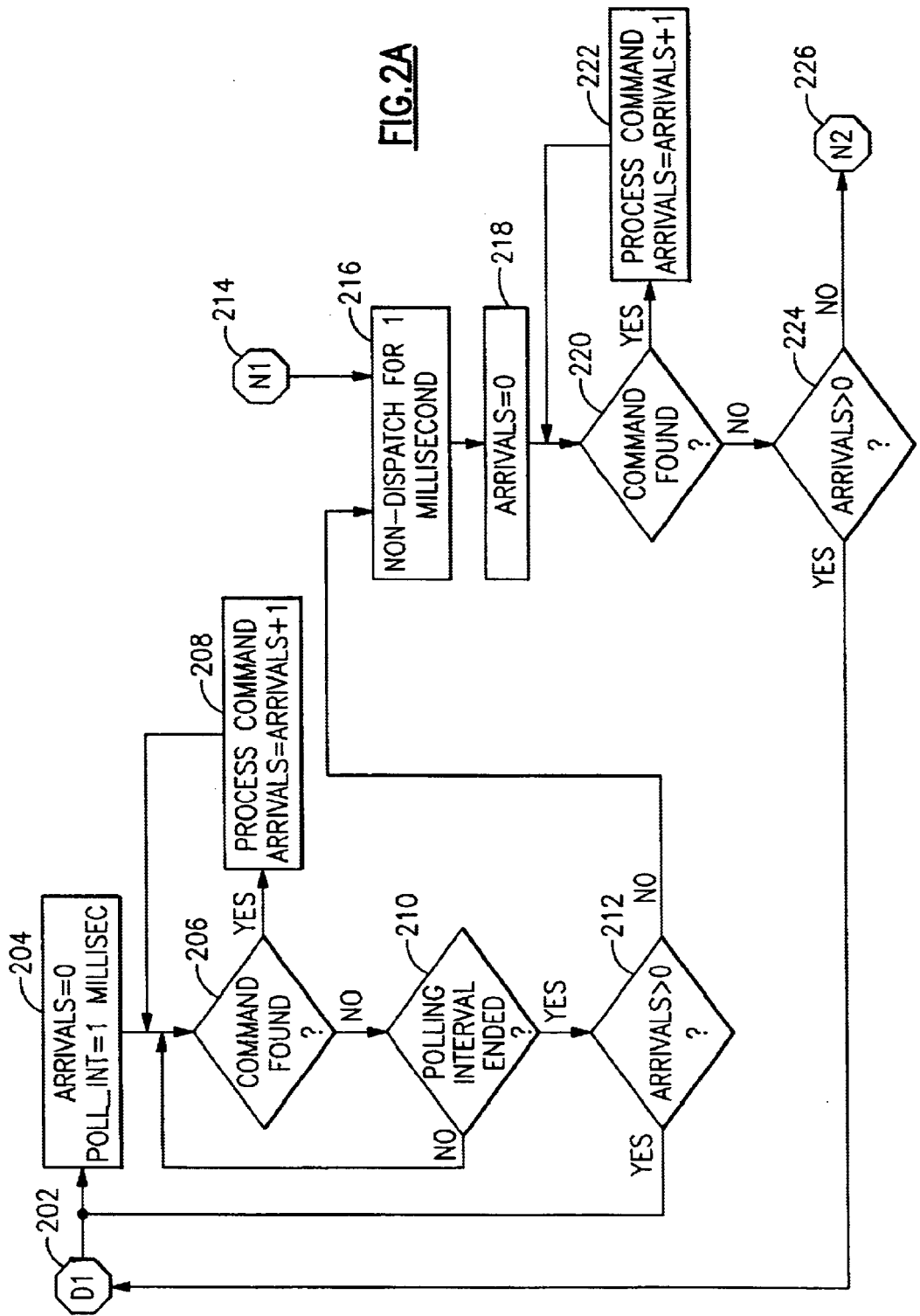
FIGS. 2A–2C are a flowchart of the dispatching procedure of the present invention.
Figure 2B:
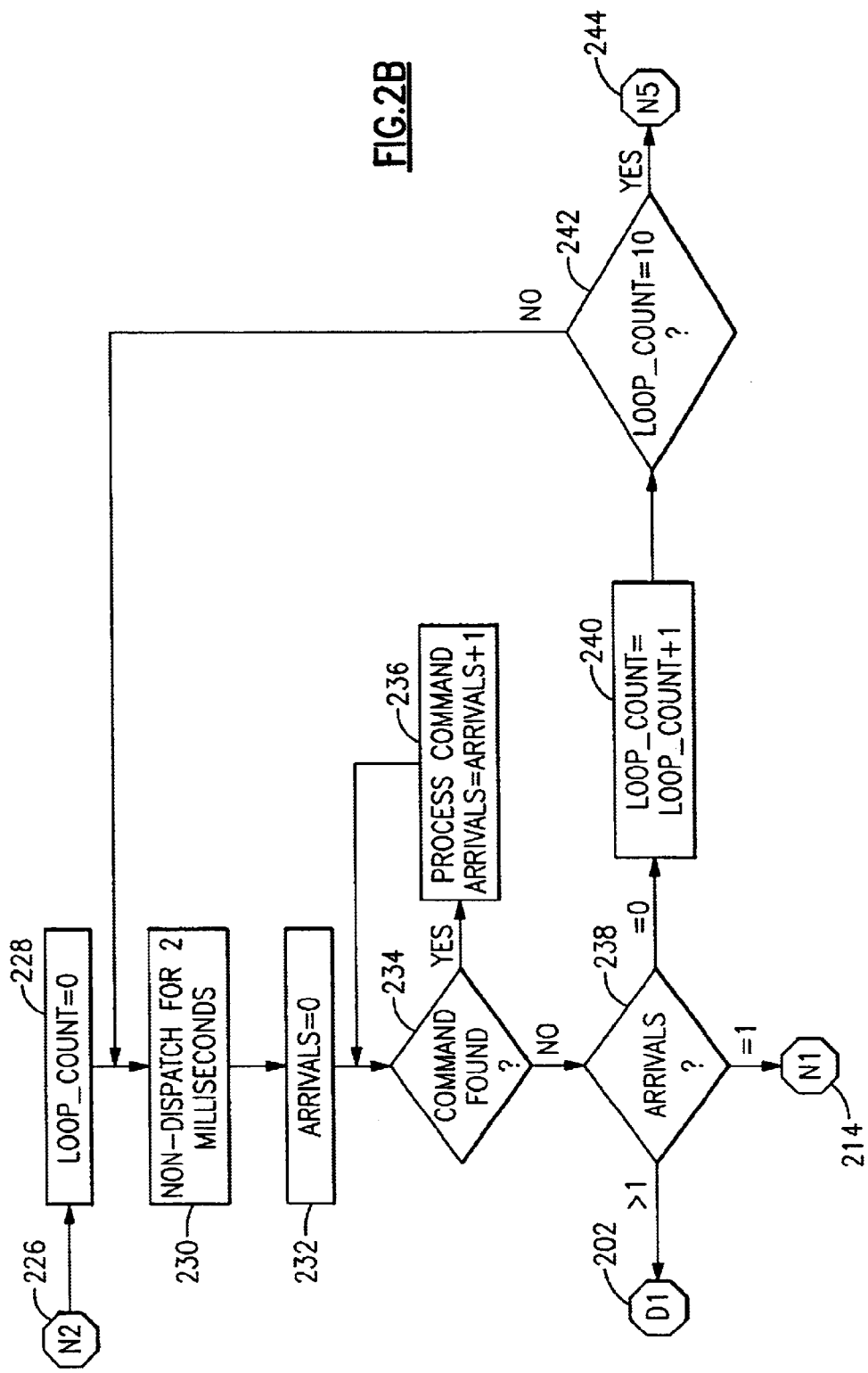
Figure 2C:
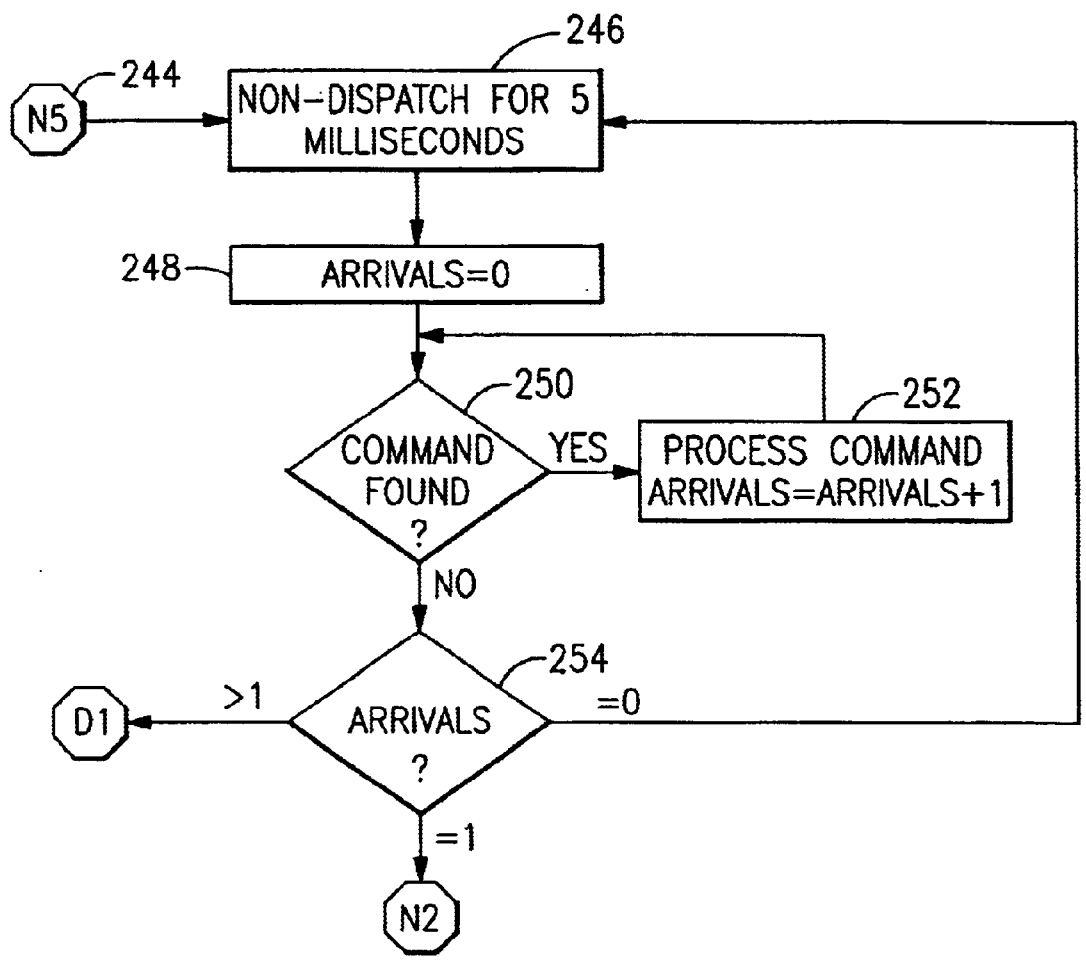

FIGS. 2A–2C show in greater detail the dispatching procedure 200 exemplified by the above pseudocode. Referring to FIG. 2A, the dispatching procedure begins in continuous dispatching mode (D1) at step 202 (D1). Initially, the dispatching procedure resets the number of arrivals to zero and the sets poll_int at 1 millisecond (ms) to begin a 1 ms polling interval (step 204). Each time a coupling facility request is found during the polling interval (step 206), the procedure processes the request and increments the number of arrivals by one (step 208). At the end of the 1ms polling interval (step 210), the dispatching procedure determines whether at least one coupling facility request has arrived during the polling interval (step 212). If so, the procedure remains in continuous dispatching mode (D1) and returns to step 202 to execute as before.

If no coupling facility request has arrived during the polling interval in continuous dispatching mode (D1), the dispatching procedure changes over to 1 ms non-dispatched mode (N1) (step 214). In this mode, the dispatching procedure waits for 1 ms without dispatching the polling loop (step 216). The procedure then resets the number of arrivals at zero (step 218) and runs the polling loop once (step 220); if a coupling facility request arrives during the running of this loop, it is processed and the number of arrivals is incremented by 1 (step 222). If any coupling facility requests have arrived during the running of the loop, the dispatching procedure returns to continuous dispatching mode (D1) (step 224).

If no coupling facility request has arrived during the running of the polling loop in 1 ms non-dispatched mode (N1), the dispatching procedure changes over to 2 ms non-dispatched mode (N2) (step 226). Upon entering this mode, the procedure initializes a loop count at zero (step 228) and waits for 2 ms without dispatching the polling loop (step 230). The procedure then resets the number of arrivals at zero (step 232) and runs the polling loop once (step 234); if a coupling facility request arrives during the running of this polling loop, it is processed and the number of arrivals is incremented by 1 (step 236). If more than one coupling facility request has arrived during the running of the polling loop, the dispatching procedure returns to continuous dispatching mode (D1); on the other hand, if only one coupling facility request has arrived during the running of the polling loop, the dispatching procedure returns to 1 ms non-dispatched mode (N1) (step 236).

If no coupling facility request has arrived during the running of the polling loop in 2 ms non-dispatched mode (N2), the dispatching procedure increments the loop count (step 240) and determines whether the loop count has been incremented to ten (step 242). If it has not, the procedure remains in 2 ms non-dispatched mode and returns to step 230.

If the loop count has been incremented to ten, then the procedure changes over to 5 ms non-dispatched mode (N5) (step 244). Upon entering this mode, the procedure waits for 5 ms without dispatching the polling loop (step 246). The procedure then resets the number of arrivals at zero (step 248) and runs the polling loop once (step 250); if a coupling facility request arrives during the running of this polling loop, it is processed and the number of arrivals is incremented by 1 (step 252). If more than one coupling facility request has arrived during the running of the polling loop, the dispatching procedure returns to continuous dispatching mode (D1); if only one coupling facility request has arrived during the running of the polling loop, the dispatching procedure returns to 2 ms non-dispatched mode (N2); finally, if no coupling facility request has arrived during the running of the polling loop, the dispatching procedure remains in 5 ms non-dispatched mode (N5) and returns to step 246 (step 254).

The invention has been described in the context of a coupling facility operating in a logically partitioned environment. However, the invention is useful in any situation where a synchronous requester and a request handler use the same processor resource.

The invention is preferably implemented as microcode (i.e., a machine-readable program of instructions tangibly embodied on a program storage devices) executing on one or more hardware machines. While a particular embodiment has been shown and described, various modifications will be apparent to those skilled in the art.

What is claimed is:

1. In an information handling system in which one or more requesters issue requests to a request handler executing on a processor resource, a method of dynamically controlling the execution of said request handler on said processor resource, comprising the steps of:
    defining a plurality of modes of executing said request handler on said processor resource, said modes having differing amounts of utilization of said processor resource;
    initially selecting one of said modes of executing said request handler on said processor resource;
    determining the number of requests received from said requesters within a predetermined interval while executing said request handler in a selected mode; and
    transitioning between said modes of executing said request handler in accordance with said number of requests received within said predetermined interval in said selected mode.

2. The method of claim 1 in which said determining step and said transitioning step are performed iteratively in an alternating manner.

3. The method of claim 1 in which said modes differ in relative dispatch duration.

4. The method of claim 1 in which said modes have differing periods of time during which said request handler is not dispatched.

5. The method of claim 1 in which said requesters execute on the same processor resource as said request handler.

6. The method of claim 1 in which said requesters remain in a busy state pending completion of said requests by said request handler.

7. The method of claim 1 in which said requesters and said request handler reside in different logical partitions of a logically partitioned system.

8. A program storage device readable by a machine, tangibly embodying a program of instructions executable by the machine to perform the method steps of claim 1.

9. In an information handling system in which one or more requesters issue requests to a request handler executing on a processor resource, apparatus for dynamically controlling the execution of said request handler on said processor resource, comprising:
    means for defining a plurality of modes of executing said request handler on said processor resource, said modes having differing amounts of utilization of said processor resource;
    means for initially selecting one of said modes of executing said request handler on said processor resource;
    means for determining the number of requests received from said requesters within a predetermined interval while executing said request handler in a selected mode; and
    means for transitioning between said modes of executing said request handler in accordance with said number of requests received within said predetermined interval in said selected mode.

10. The apparatus of claim 9 in which said requesters execute on the same processor resource as said request handler.

11. The apparatus of claim 9 in which said requesters remain in a busy state pending completion of said requests by said request handler.

12. The apparatus of claim 9 in which said requesters and said request handler reside in different logical partitions of a logically partitioned system.

13. In an information handling system in which one or more requesters issue requests to a request handler executing on a processor resource, said requesters executing on the same processor resource as said request handler and remaining in a busy state pending completion of said requests by said request handler, a method of dynamically controlling the execution of said request handler on said processor resource, comprising the steps of:
    defining a plurality of modes of executing said request handler on said processor resource, said modes having differing amounts of utilization of said processor resource;
    initially selecting one of said modes of executing said request handler on said processor resource;
    determining the number of requests received from said requesters within a predetermined interval while executing said request handler in a selected mode; and
    transitioning between said modes of executing said request handler in accordance with said number of requests received within said predetermined interval in said selected mode.

14. The method of claim 13 in which said requesters and said request handler reside in different logical partitions of a logically partitioned system.

15. A program storage device readable by a machine, tangibly embodying a program of instructions executable by the machine to perform the method steps of claim 13.

* * * * *